Oct. 27, 1931.   J. M. NEENAN   1,828,845
SHEET GLASS DRAWING APPARATUS
Filed Dec. 15, 1926
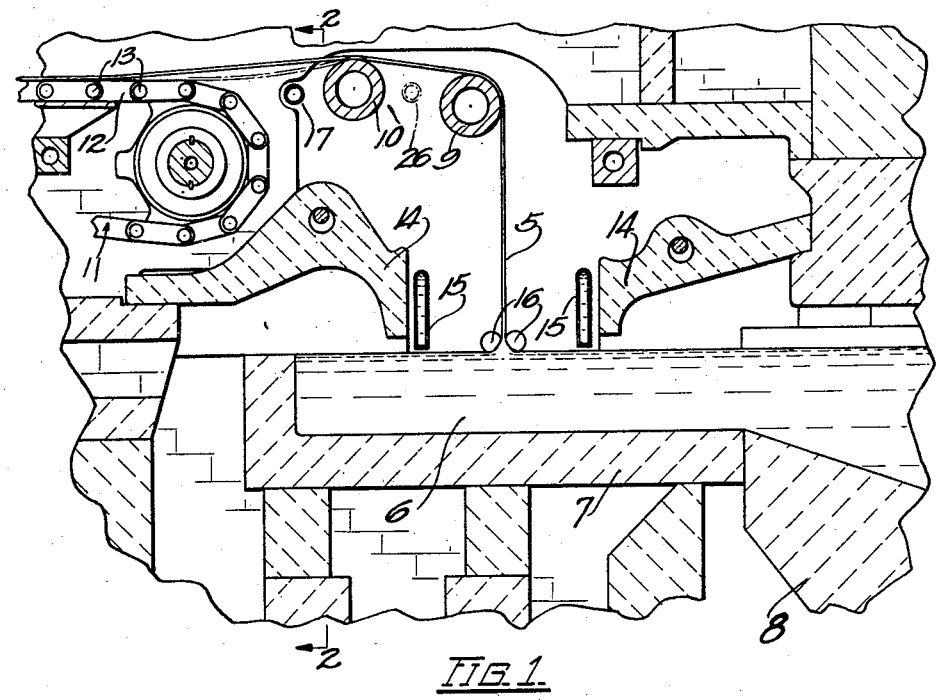
Fig. 1
Fig. 2
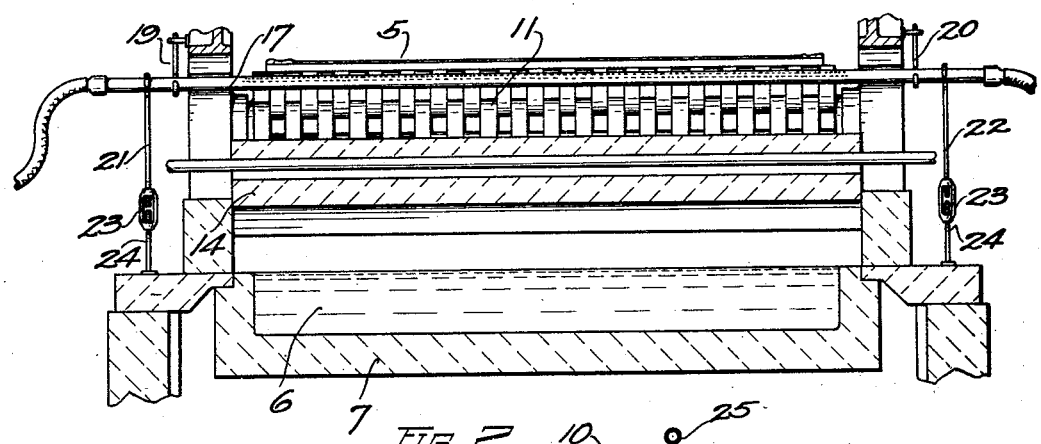
Fig. 3
Fig. 4
Inventor
Joseph M. Neenan
By Frank Fraser
Attorney Patented Oct. 27, 1931

1,828,845

UNITED STATES PATENT OFFICE

JOSEPH M. NEENAN, OF CHARLESTON, WEST VIRGINIA, ASSIGNOR TO LIBBEY-OWENS-FORD GLASS COMPANY, OF TOLEDO, OHIO, A CORPORATION OF OHIO

SHEET GLASS DRAWING APPARATUS

Application filed December 15, 1926. Serial No. 154,863.

This invention relates to improvements in the art of producing sheet glass, and has more particular reference to the drawing of a continuous sheet.

In certain forms of sheet glass drawing apparatus, for example, that disclosed in Colburn Patent No. 1,248,809, granted Dec. 4, 1917, the sheet of glass, after being drawn vertically from the molten source, is bent into the horizontal plane about a rotatable bending roll and passed over an idler roll onto the flat upper surface of a horizontally travelling flattening and drawing table or conveyor. This flattening table comprises an endless flexible belt consisting of a series of pivotally connected metallic links, the belt passing about a pair of supporting drums at the two ends of the loop, and the upper sheet carrying run of the belt being slidably supported on the flat upper surface of a stationary table mounted between the two drums. The plastic glass sheet is carried by the flat upper surface of this link belt and settles thereupon, becoming flat while being carried by and along with the conveyor belt. The friction of the sheet resting upon the travelling table serves to provide a tractive pull for drawing the glass sheet from its molten source.

When the glass sheet passes from the idler roll onto the flattening or draw table it is still in a plastic condition and susceptible to surface marks or irregularities. As the endless belt passes around the drums into its upper horizontal run, the metallic links thereof have a tendency to buckle up or project into the upper flat horizontal plane occupied by the plastic glass sheet and the lifting or buckling of the links at the two ends of their upper horizontal run cause impressions or defects in the glass sheet which are known as table marks or bumps. Moreover, the glass sheet has a tendency to sag between the idler roll and flattening table which renders it even more apt to be marred by the links as it passes onto the table just about the point where the buckling up of the links occurs. Again, the sheet as it passes onto the flattening table is still very hot and plastic with the result that there is a tendency for it to sag between the metallic links thereof.

An important object of the present invention is to provide in sheet glass apparatus means whereby the surface irregularities or table marks caused by the draw table links can be eliminated, thus making it possible to produce a smoother sheet.

Another object of the invention is to provide in sheet glass apparatus improved means for conditioning the sheet so that it will be cooler as it enters upon the draw or flattening table and therefore less subject to sag between the links thereof.

A further object of the invention is to provide in sheet glass apparatus means for preventing the sagging of the sheet between the idler roll and the flattening table, thus causing the sheet to pass onto the table later and therefore further away from the buckling up action of the metallic links.

A still further object of the invention is to provide in sheet glass apparatus, an air pipe extending transversely of the sheet and positioned at a point between the idler roll and flattening table for directing the air onto the sheet whereby to cool the same prior to its passing onto the flattening table.

Still another and important object of the invention is to provide means for preventing the air pipe from sagging whereby to insure a uniform distribution of the air upon the sheet throughout its entire width.

Other objects and advantages of the invention will become more apparent during the course of the following description when taken in connection with the accompanying drawings.

In the drawings wherein like numerals are employed to designate like parts throughout the same.

Fig. 1 is a vertical longitudinal section through improved sheet glass drawing apparatus constructed in accordance with the present invention.

Fig. 2 is a section taken on line 2—2 of figure 1.

Fig. 3 is a transverse section through one of the air pipes.

Fig. 4 is a view showing a slightly modified form of the present invention.

In the Colburn process above referred to, a sheet 5 is continuously drawn from a mass of molten glass 6 contained in a so-called draw pot 7, the draw pot being continuously replenished with molten glass from a tank furnace 8. The sheet 5 is drawn preferably in a vertical plane initially, and subsequently deflected horizontally and drawn over a bending roll 9, idler roll 10, and endless flexible conveyor belt or flattening table 11. It will be noted that the sheet 5 is not only deflected about the bending roll 9 but is also bent slightly as it passes over the idler roll 10 so that this latter roll may also be termed a deflecting or bending roll as well as a sheet supporting member or roll. Thus, the sheet is drawn initially in a generally vertical direction and is deflected first about the bending roll 9 into an inclined plane and subsequently deflected about the bending roll 10 into a substantially horizontal plane, the angle of deflection about the roll 10 being considered less than about the roll 9.

The flattening table 11 comprises a series of metallic links 12, arranged in an overlapping and intermeshing relation with their ends pivoted on continuous cross shafts 13 which extend completely across the width of the belt. The sheet of glass rests upon the upper flat horizontal surface of the links as shown in Fig. 1.

Arranged above the pot 7 are cover or lip tiles 14 which tend to force any heat currents present at that point downwardly toward the surface of the molten glass 6. Coolers 15 are disposed relatively close to the surface of the molten glass from which the sheet is drawn and absorb sufficient heat to permit the drawing of a good sheet of glass. Edge treating means in the form of knurled rollers 16 are also provided adjacent the source of molten glass 6 to maintain the sheet to width.

In flattening tables of the character above described, there is a tendency for the links thereof to buckle up at the two ends of their upper horizontal run and project into the upper flat horizontal plane occupied by the glass sheet. The lifting or buckling of the links causes impressions or defects in the glass sheet as it passes onto the flattening table. The sheet also, because of its plastic condition, normally sags between the idler roll 10 and flattening table 11, as indicated by dotted lines in Fig. 1, so that it is even more apt to be marred by the metallic links 12 as it passes onto the table close to the buckling point of said links.

The present invention consists essentially in the provision of means for cooling the sheet while in its horizontal plane and preferably though not essentially just prior to its passing onto the flattening table 11. The advantages of such an arrangement will be more clearly hereinafter apparent.

In accordance with the present invention the idler roll 10 is slightly elevated above the bending roll 9 as shown in Fig. 1, and positioned at a point between the idler roll 9 and flattening table 11 is an air pipe 17 for directing a supply of air onto the sheet whereby to cool the same. This air pipe 17 is preferably, though not necessarily, positioned beneath the sheet and extends the entire width thereof. The pipe 17 is provided with a sufficient number of openings 18, so that the air will be uniformly distributed upon the sheet throughout its entire width.

The advantages of such an arrangement will at once be apparent. The cooling of the sheet just prior to its passing onto the flattening table will render it less susceptible to surface marks or impressions caused by the metallic links thereof, thus making it possible to produce a smoother sheet and one which is relatively free from table marks or bumps. Again, the sheet being cooler as it enters upon the flattening table will have less tendency to sag between the lnks thereof, thus allowing for greater temperature fluctuation in the operation of the table. Furthermore, the cooling of the sheet at this point will cause it to be firmer and thus less apt to sag between the idler roll and flattening table as it passes onto the flattening table later and therefore further away from the point where the buckling-up action of the links occurs.

The pipe 17 is loosely supported adjacent its opposite ends upon hooks 19 and 20. In order to prevent the pipe from sagging and thus causing an ununiform distribution of the air upon the sheet, there are provided rods 21 and 22, the upper ends of which are hooked over the said pipe outwardly of the supporting hooks 19 and 20. The lower ends of the said hooks 21 and 22 are threaded within turn buckles 23 which are in turn threaded upon vertical rods 24. It will thus be seen that should the pipe 17 have any tendency to sag, it is simply necessary to rotate the turn buckles 23 in order to tighten up on the rods 21 and 22.

In Fig. 4, wherein has been disclosed a somewhat modified form of the present invention, it will be noted that in addition to the air pipe 17 positioned beneath the sheet, there is also provided a second air pipe 25 positoned above the sheet for directing air onto the upper surface thereof. In accordance with the present invention it is to be understood that the pipes 17 and 25 can be used in combination with one another, or either one of these pipes may be eliminated as desired.

Also, as shown in Fig. 1 a second air pipe 26 may be positioned beneath the sheet between the bending roll 9 and idler roll 10 for directing a current of air onto the sheet at this point whereby to cool the same and prevent sagging thereof. This air pipe 26 may be used in combination with the air pipe 17 or either one of the pipes 17 and 26 may be eliminated as desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet from a mass of molten glass, an air pipe extending transversely of the sheet for directing a supply of air onto said sheet prior to its engagement with said drawing means, and means for preventing sagging of said pipe.

2. In sheet glass apparatus, means for drawing a sheet from a mass of molten glass, means for deflecting said sheet from a vertical into a horizontal plane, an air pipe extending transversely of the sheet for directing a current of air onto said sheet while said sheet is in a horizontal plane, and prior to its engagement with said drawing means, and adjustable means for preventing sagging of said air pipe.

3. In apparatus for producing sheet glass, means for drawing a sheet in a generally vertical direction from a mass of molten glass, a bending member about which the sheet is deflected from the vertical into a substantially horizontal plane, a member elevated above the drawing means for supporting the sheet while in said substantially horizontal plane, and means for preventing sagging of the sheet including means for cooling the sheet between said bending and supporting members.

4. In apparatus for producing sheet glass, means for drawing a sheet in a generally vertical direction from a mass of molten glass, a bending member for deflecting the sheet from the vertical into a substantially horizontal plane, a member positioned between the bending member and drawing means for supporting the sheet while in said substantially horizontal plane, and means for preventing sagging of the sheet including means for cooling the sheet between said supporting and bending members to prevent sagging thereof.

5. In apparatus for producing sheet glass, means for drawing a sheet from a mass of molten glass, a pipe cooler extending transversely of the sheet for cooling the same prior to its engagement with said drawing means, and means for supporting and preventing sagging of said cooler.

Signed at Charleston, in the county of Kanawha and State of West Virginia, this 8th day of December, 1926.

JOSEPH M. NEENAN.